United States Patent [19]

Takayama

[11] 4,423,424
[45] Dec. 27, 1983

[54] THERMAL HEAD FOR FACSIMILE PRINTER

[75] Inventor: Shoichiro Takayama, Tokyo, Japan

[73] Assignee: Oki Electric Industry Co., Ltd., Tokyo, Japan

[21] Appl. No.: 327,211

[22] Filed: Dec. 3, 1981

[30] Foreign Application Priority Data

Dec. 8, 1980 [JP] Japan .................. 55/171995

[51] Int. Cl.$^3$ .................................. G01D 15/10
[52] U.S. Cl. ..................... 346/76 PH; 400/120
[58] Field of Search ................ 346/1.1, 76 PH; 400/120; 219/216 PH

[56] References Cited

U.S. PATENT DOCUMENTS

| | | | |
|---|---|---|---|
| 3,984,844 | 10/1976 | Tanno et al. | 346/76 PH |
| 4,149,171 | 4/1979 | Sato et al. | 400/120 X |
| 4,322,733 | 3/1982 | Moriguchi et al. | 346/76 PH |
| 4,360,818 | 11/1982 | Moriguchi et al. | 346/76 PH |

OTHER PUBLICATIONS

Catalogue entitled "Thermal Print Head KH107 Series", by Toyo Dengu Manufacturing Co., Ltd., Japan.

Primary Examiner—Donald A. Griffin
Attorney, Agent, or Firm—Armstrong, Nikaido, Marmelstein & Kobovcik

[57] ABSTRACT

An improved thermal head having a continuous thermal line which is provided with the cells ($r_1$, $r_2$, $r_3$, $r_4$, et al.) on a substrate has been found. A first set of lead wires ($A_1$, $A_2$, et al.), a second set of lead wires ($B_1$, $B_2$, et al.), and a plurality of group recognition lines ($S_1$, $S_2$, et al.) are provided on the substrate, and those lines are coupled with the cells so that each cell is sandwiched between one of said lead lines and one of said group recognition lines. The first and second lead lines are mounted on the opposite sides of the thermal line from each other, and those lead lines provide printing data through respective transistor switches according to the picture signal to be printed. One of the group recognition lines ($S_1$, $S_2$, et al.) supplies the power voltage for energizing the cells, and other group recognition lines are supplied to the clamp voltage which is lower than the power voltage. The group recognition line which is supplying the power voltage is switched alternately among all the group recognition lines, and the present thermal head is energized with a plurality of phases.

5 Claims, 5 Drawing Figures

THERMAL HEAD FOR FACSIMILE PRINTER

BACKGROUND OF THE INVENTION

The present invention relates to a thermal printer head for a facsimile printer, in particular, relates to such a thermal head having a linear continuous heater line, which is manufactured through a thick film resistor technique.

Conventionally, a thermal head has a plurality of thermal cells each of which is individually heated in order to heat a treated thermal paper selectively. That thermal paper changes color upon heated, and the thermal printing is accomplished by those thermal cells.

However, that prior thermal head with separated thermal cells has the disadvantage that the structure is complicated and/or the manufacturing cost of the same is high, since many cells insulated from each other must be mounted in a short length, and the density of the cells is extremely high.

Another conventional thermal head is shown in FIG. 1, in which a thermal head has a linear continuous line manufactured through a thick film resistor technique. As a thermal head is merely a continuous line, but has no separated thermal cells, the manufacturing process of that linear thermal line is simple. In FIG. 1, the reference numeral 1 is a thermal resistor line, 2 is a diode, and 3 is a transistor switch.

The thermal resistor line 1 has a plurality of lead wires for all the cell portions ($r_1$, $r_2$, $r_3$, et al.) on both the sides of the line, alternately. Those cell portions ($r_1$, $r_2$, $r_3$, et al.) operate substantially as a thermal cell. The lead wires are provided on the substrate on which the thermal line 1 is provided. The first group of lead wires on one side of the thermal line 1 are coupled with the transistor switches 3, each base input of which is provided with an input signal ($B_1$, $B_2$, $B_3$, et al.). The second group of lead wires on the other side of the thermal line 1 are classified further to two groups, alternately, and the first sub-group of lead wires are coupled with the first power source $S_1$ through respective diodes 2, and the second sub-group of lead wires are coupled with the second power source $S_2$ through the respective diodes 2.

When the first power source $S_1$ is ON, the cells ($r_2$, $r_3$), ($r_6$, $r_7$), ($r_{10}$, $r_{11}$), ($r_{14}$, $r_{15}$), are energized according to the input signals at the inputs ($B_1$, $B_2$, et al.). Next, when the second power source $S_2$ is ON, the cells ($r_0$, $r_1$), ($r_4$, $r_5$), ($r_8$, $r_9$), ($r_{12}$, $r_{13}$), are energized according to the input signal at the inputs ($B_1$, $B_2$, et al.). For instance, when the first power source $S_1$ is ON, and the input terminals $B_2$ and $B_5$ have the input signals, then, the cells $r_3$ and $r_{10}$ are heated. It should be noted in this case that another current path is provided from the first power source $S_1$ through the diode 2, the cells $r_7$, $r_8$, $r_9$, to the input $B_5$, however, the intermediate cells $r_7$ through $r_9$ are not heated enough to print on a thermal paper. Because the current in said another current path is small because of the series connection of a plurality of resistor cells, and thus, the temperature in those intermediate cells is not much increased.

However, the thermal head of FIG. 1 has the disadvantage that many diodes and transistors are necessary for energizing selectively each cell. In the configuration of FIG. 1, if the number of transistors and/or diodes were reduced, undesired cells would be heated to print a thermal paper, and no clear printed copy would be obtained in a facsimile reception system.

SUMMARY OF THE INVENTION

It is an object, therefore, of the present invention to overcome the disadvantages and limitations of a prior thermal head by providing a new and improved thermal head.

It is also an object of the present invention to provide a thermal head in which the structure is simple, a diode of FIG. 1 is unnecessary, and the number of switching transistors is reduced.

The above and other objects are attained by a thermal head comprising a continuous linear thermal line attached on a substrate; said thermal line being provided with a plurality of cells ($r_1$, $r_2$, et al.) which are classified into a plurality of groups each having 2n (n is an even integer) cells; a first set of lead wires each coupled with a cell with a predetermined interval and being provided on one side of the thermal line for providing printing data to the thermal line through a respective transistor switch which is controlled by an input picture signal; a second set of lead wires each coupled with a cell with a predetermined interval and being provided on the other side of the thermal line for providing printing data to the thermal line through a respective transistor switch which is controlled by an input picture signal; n number of group recognition lines ($S_1$, $S_2$, et al.) each coupled with cells directly in every 2n cells of said thermal line, half number of said group recognition lines being provided on one side of the thermal line, and the other half number of the same being provided on the other side of the thermal line; said group recognition lines and the lead wires being coupled with the cells so that each cell is sandwiched between one of the lead lines and one of the group recognition lines; one of said group recognition lines being provided with a power voltage for energizing thermal cells; other group recognition lines being clamped to the predetermined voltage which is lower than said power voltage; and the group recognition line which is provided with a power supply voltage is switched alternately among all the group recognition lines.

Preferably, the number n is one selected from 2, 4, 8 and 16.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
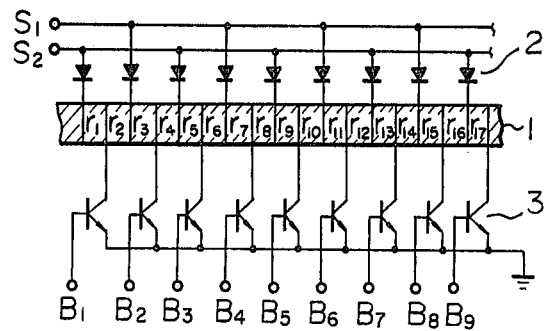
FIG. 1 shows a structure of a prior thermal head.
Figure 2:
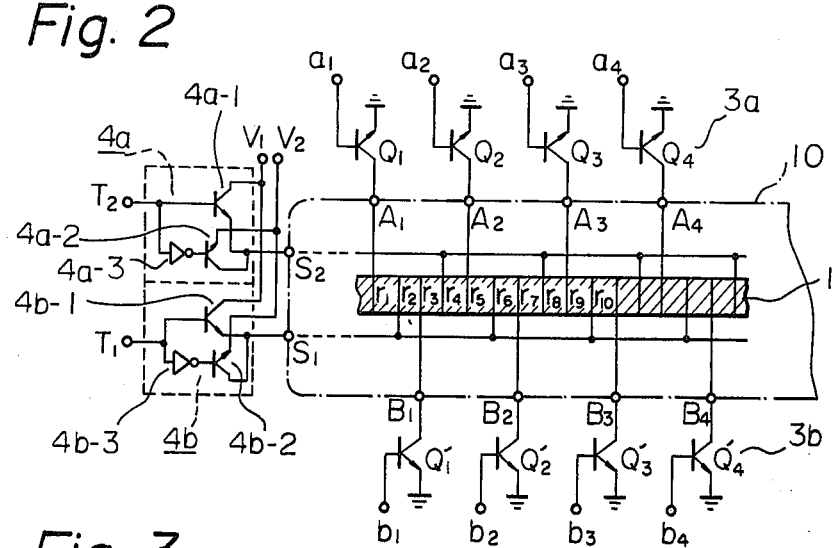
FIG. 2 shows a structure of the thermal head according to the present invention.

FIG. 2 shows the embodiment of the present thermal head 10. In the figure, the reference numeral 1 is a continuous thermal resistor heater line having a plurality of thermal cells ($r_1$, $r_2$, $r_3$, et al.), which are not insulated from each other, the reference symbols ($A_1$, $A_2$, $A_3$, $A_4$, et al.) and ($B_1$, $B_2$, $B_3$, $B_4$, et al.) are lead wires coupled with that thermal heater line 1. The symbols $S_1$ and $S_2$ are group recognition lines. It should be appreciated in FIG. 1 that a lead wire $A_i$ (i is an integer) and a lead wire $B_i$ (i is an integer) are provided for every four thermal cells, and that the group recognition lines $S_1$ and $S_2$ are also provided for every four thermal cells. In general, when there are n (n is an even integer) number of group recognition lines ($S_1$ through $S_n$), the cells are classified into 2n cells, and each group recognition line is coupled with a cell in every 2n cell intervals. Each cell is coupled with either one of the lead wires ($A_i$, $B_i$), or one of the group recognition lines ($S_j$), and each cell is coupled with a lead wire or a group recognition wire so that the cell is sandwiched between one of the lead wires ($A_i$, $B_i$) and one of the group recognition lines ($S_j$).

The thermal head has an insulation substrate (not shown), on which the thermal heater line 1, and the lead wires $A_i$ and $B_i$, and the group recognition lines $S_1$ and $S_2$ are provided through a thick film and/or thin film technique process. The reference numeral 3a is a transistor switch group having transistors ($Q_1$, $Q_2$, $Q_3$, $Q_4$, et al.), and ($a_1$, $a_2$, $a_3$, $a_4$, et al.) are input terminals for those transistors for accepting a picture data. Those transistor switches are coupled with the lead wires ($A_1$, $A_2$, $A_3$, $A_4$, et al.). The reference numeral 3b is the other transistor switch group having transistors ($Q_1'$, $Q_2'$, $Q_3'$, $Q_4'$, et al.), and ($b_1$, $b_2$, $b_3$, $b_4$, et al.) are input terminals for those transistors for accepting a picture data. Those transistor switches are coupled with the lead wires ($B_1$, $B_2$, $B_3$, $B_4$, et al.). The symbol $V_1$ is the power terminal coupled with the power source for energizing the thermal head 10, and $V_2$ is the clamp terminal coupled with the clamping power source which provides the clamp voltage. The clamp voltage is lower than the power voltage $V_1$, and for instance the absolute value of $V_2$ is $\frac{1}{2}$ of the absolute value of $V_1$. The clamp voltage $V_2$ absorbs the return current. The symbols 4a and 4b are switching circuits for coupling either the power source $V_1$ or the clamping power source $V_2$ to the group recognition lines $S_1$ and $S_2$, according to the input signals in the input terminals $T_1$ and $T_2$, respectively.

The switching circuit 4a has transistors 4a-1 and 4a-2, and inverter 4a-3. When the input signal at the terminal $T_2$ is ON, the transistor 4a-1 is conducted, and the transistor 4a-2 is non-conducted, and thus, the line $S_2$ is coupled with the power source $V_1$. On the other hand, when the input signal at the terminal $T_2$ is OFF, then, the line $S_2$ is coupled with the clamp power source $V_2$. The structure of the switching circuit 4b is similar to that of 4a, and the line $S_1$ is coupled with the power source $V_1$ or the clamp power source $V_2$, according to the control signal at the terminal $T_1$.

When the first group recognition line $S_1$ is energized according to the input signal on the terminal $T_1$, the voltage $V_1$ appears on the lines $S_1$, it is supposed that the second group recognition line $S_2$ is clamped to the voltage $V_2$. In this case, a thermal cell $r_1$, $r_2$, $r_5$, $r_6$, $r_9$, or $r_{10}$ is heated according to the picture information at the input terminals ($a_1$, $b_1$, $a_2$, $b_2$, $a_3$, $b_3$, . . . ).

Next, when the second group recognition line $S_2$ is energized according to the input signal on the terminal $T_2$, the voltage $V_1$ appears on the line $S_2$, and it is supposed that the first group recognition line $S_1$ is clamped to the voltage $V_2$ (=$V_1/2$). In this case, a thermal cell $r_3$, $r_4$, $r_7$, or $r_8$ is heated according to the picture information at the input terminals ($b_1$, $a_2$, $b_2$, $a_3$).

When the line $S_1$ is at the voltage $V_1$, the line $S_2$ is clamped to the voltage $V_1/2$, and the voltage higher than $V_1/2$ induced on the line $S_2$ is absorbed in the voltage $V_2$. Similarly, when the line $S_2$ is at the voltage $V_1$, the line $S_1$ is clamped to the voltage $V_1/2$, and the voltage higher than $V_1/2$ induced on the line $S_1$ is absorbed in the clamp power source.

With the above configuration, only the desired cells are heated enough to print a treated thermal paper, and no undesired cell prints on a thermal paper. For instance, when the line $S_1$ is ON, having the voltage $V_1$, the lead wire $A_2$ is in ON status, and all the other lead wires are in OFF status, then, the cell $r_5$ is heated by the current from the line $S_1$ through the cell $r_5$, to the lead wire $A_2$. In this case, the cell $r_4$ is also insufficiently heated by the current from the line $S_1$ through the cells $r_2$, $r_3$ and $r_9$, $r_8$ to the lead wire $S_2$. However, it should be noted that the voltage on the line $S_2$ is only $V_1/2$, and therefore, the cell $r_4$ generates the $\frac{1}{4}$ of heat as much as that of the cell $r_5$, and since $\frac{1}{4}$ of heat is under the threshold level of changing the color of a thermal paper, the cell $r_4$ is not printed, but only the cell $r_5$ is printed.

With the above configuration, the lead wires $A_i$ and $B_i$ have the $\frac{1}{4}$ number of lines of the cells. For instance, when there are 2000 cells, the number of lead wires 3a and 3b is only 500 lines, respectively, and all the cells are subject to be heated by the two phase operations. It should be appreciated that the group recognition lines $S_1$ and $S_2$ are directly coupled with the cells without any diode, and the number of transistors coupled with the input lines $A_i$ and $B_i$ in each side of the thermal line is halved as compared with those of a prior art of FIG. 1.

The structure that the group recognition lines are directly coupled with the cells without any diode is one of the features of the present invention, and since the input lines $A_i$ or $B_i$ in each side of the thermal line is halved as compared with that of FIG. 1, the structure of the present thermal head is simplified.

It should be appreciated that the clamp power source has negative polarity, and then, the power consumption of the clamp power source is small.

Figure 3:
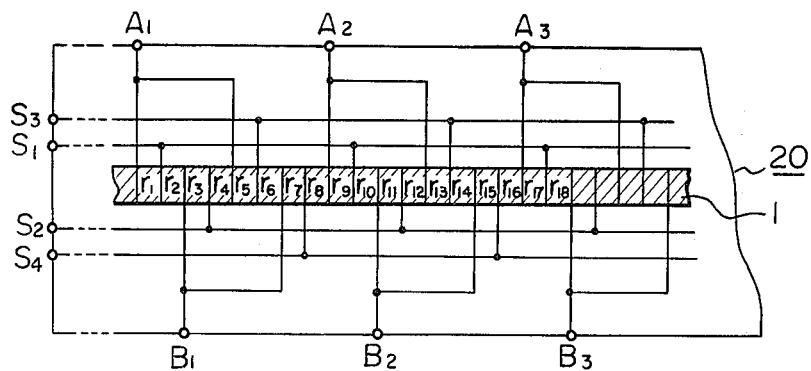
FIG. 3 shows another embodiment of the structure of the thermal head according to the present invention.

FIG. 3 shows another embodiment of the present thermal head 20. In the figure, the thermal head 20 has a substrate (not shown) with the linear thermal lines 1 having the cells $r_1$, $r_2$, $r_3$, . . . , $r_{18}$, . . . , et al. The feature of the embodiment of FIG. 3 is that there are four recognition lines $S_1$, $S_2$, $S_3$, and $S_4$, and that the number of lead wires ($A_1$, $A_2$, $A_3$, et al.), and ($B_1$, $B_2$, $B_3$, et al.) is only one eighth ($\frac{1}{8}$) of the number of the thermal cells. When there are 2000 thermal cells, the number of the first lead wires $A_1$, $A_2$, $A_3$, et al. is 250, and the number of the second lead wires $B_1$, $B_2$, $B_3$, et al. is also only 250. Therefore, even the high density thermal head with 8 cells/mm is possible either by providing external transistor switches or by providing internal transistor switches mounted on the same substrate as the thermal head itself.

In FIG. 3, the first cell $r_1$ and fifth cell $r_5$ are coupled with the first upper lead wire $A_1$. The second cell $r_2$, the tenth cell $r_{10}$, and a cell in every eighth cell are coupled with the first group recognition line $S_1$. The third cell $r_3$ and the seventh cell $r_7$ are coupled with the first down lead wire $B_1$. The fourth cell $r_4$, the twelfth cell $r_{12}$, et al. are coupled with the second group recognition line $S_2$. The sixth cell $r_6$, the fourteenth cell $r_{14}$, et al. are coupled with the third group recognition line $S_3$. The seventh cell $r_7$, the fifteenth cell $r_{15}$, et al. are coupled with the fourth group recognition line $S_4$. The algorithm for coupling the cells with the group recognition lines and the lead wires is quite apparent from the above explanation, and FIG. 3. And, it should be noted that a cell is sandwiched between one of the group recognition lines ($S_i$), and one of the lead wires ($A_i$ and $B_j$).

In FIG. 3, when the line $S_1$ is in ON status receiving the power supply $V_1$, other lines $S_2$, $S_3$ and $S_4$ are clamped to the clamp voltage $V_2$, and the cells ($r_1$, $r_2$, $r_9$, $r_{10}$, $r_{17}$, $r_{18}$, et al.) are subject to be energized according to the input picture data on the lines $A_i$ and $B_i$, where i is an integer. In the second phase, the line $S_2$ is in ON status, and other lines $S_1$, $S_3$ and $S_4$ are clamped, and the cells ($r_3$, $r_4$, $r_{11}$, $r_{12}$, et al) are subject to be energized. In the third phase, the line $S_3$ is in ON status, and the lines $S_1$, $S_2$ and $S_4$ are clamped, and the cells ($r_5$, $r_6$, $r_{13}$, $r_{14}$, et al.) are subject to be heated. Finally, in the fourth phase, the line $S_4$ is in ON status, and the lines $S_1$, $S_2$ and $S_3$ are clamped, and the cells ($r_7$, $r_8$, $r_{15}$, $r_{16}$, et al.) are subject to be heated. Thus, in the four cyclic phases, all the cells are subject to be energized according to the input picture data on the lines $A_i$ and $B_i$.

Figure 4:
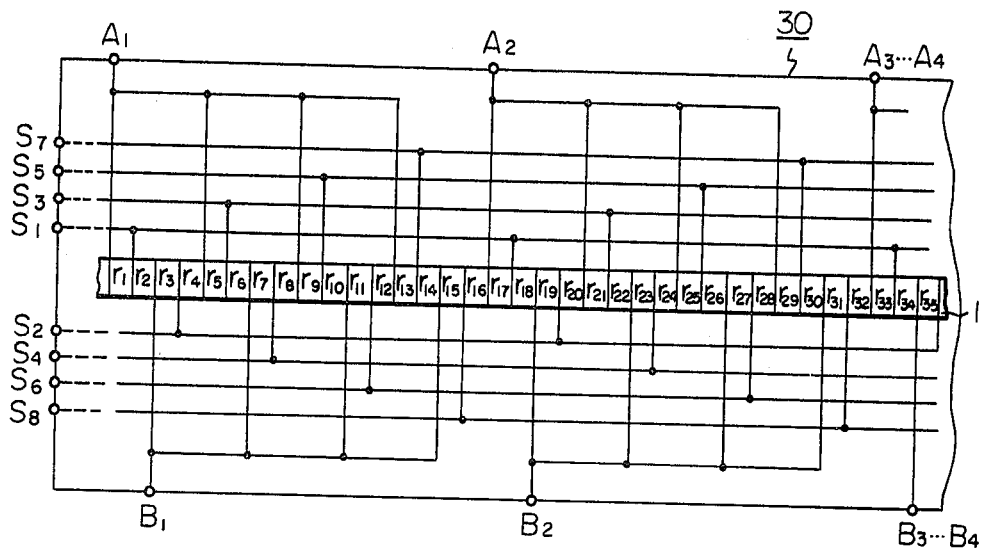
FIG. 4 shows still another embodiment of the structure of the thermal head according to the present invention.

FIG. 4 is the still another embodiment of the present thermal head, in which eight group recognition lines $S_1$ through $S_8$ are provided, and therefore, the number of input wire lines ($A_1$, $A_2$, $A_3$, et al, and $B_1$, $B_2$, $B_3$, et al.) is only 1/16 of the number of the thermal cells ($r_1$, $r_2$, $r_3$, et al.). In the embodiment of FIG. 4, the cells are energized with an 8-phase power source. It should be appreciated that the lines $S_1$ through $S_8$ may be signal input terminals, and the lines $A_1$ through $A_4$ et al. and $B_1$ through $B_4$ et al. may be coupled with the power source which energizes each line alternately and provides clamp voltage to other lines.

Figure 5:
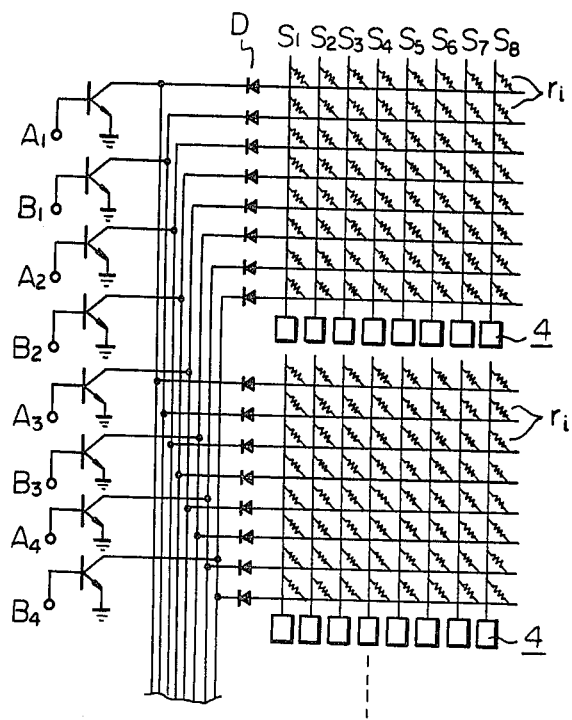
FIG. 5 shows the circuit diagram of the matrix circuit which is equivalent to the circuit of FIG. 4.

When the 64 number of thermal cells ($8 \times 8 = 64$) are grouped in FIG. 4, the structure of FIG. 4 is equivalent to the structure of the matrix circuit of FIG. 5, which shows a plurality of groups each having 64 elements. It should be appreciated that the circuit of FIG. 5 has separated thermal cells $r_i$, while the circuit of FIG. 4 has a continuous thermal line which is not separated to cells individually. Alternatively, in the matrix circuit of FIG. 5, it is possible that the lines $S_1$ through $S_8$ are connected to input signals, and $A_1$ through $A_4$, $B_1$ through $B_4$ lines are connected to group recognition lines.

In this improving version of FIG. 5, the cells are energized with an 8-phase power source. In the circuit of FIG. 4 or FIG. 5, when the clamp voltage is $0.65 V_1$, where $V_1$ is the source voltage for heating cells, the non-effective power flown in an undesired cell is calculated as follows, where $W_0$ is the desired power consumption in a selected cell.

| Number of black cells in 8 cells | Non effective power in non-selected cell |
| --- | --- |
| 1 | 3.26 $W_0$ |
| 2 | 3.81 $W_0$ |
| 3 | 3.71 $W_0$ |
| 4 | 3.72 $W_0$ |
| 5 | 2.89 $W_0$ |
| 6 | 2.14 $W_0$ |
| 7 | 1.17 $W_0$ |
| 8 | 0 |
| 0 | 0 |

Therefore, it should be noted that the maximum non-effective power is 3.81 $W_0$, which is distributed to the 62 non-selected cells ($64-2=62$), and thus, the power consumption in each non-selected cell is far lower than the threshold level for thermal printing.

Further, the power consumption of the power supply does not increase essentially because of that non-effective power. It should be noted in the above table that when all the cells (8 cells) are black or white, no non-effective power is consumed. And, even when the non-effective current flows, that current is equivalent to the case that a black line is printed a little thicker.

It should be appreciated that a facsimile thermal head having more than 8 group recognition lines is of course possible, for instance, a thermal head having the 16 or 32 group recognition lines $S_i$ is possible. When there are 2000 cells in a horizontal line in a facsimile communication, a thermal head having four group recognition lines and 500 input switching transistors is preferable for a high speed facsimile terminal, and for a slow speed facsimile terminal, a thermal head having 8–16 group recognition lines and 128–256 input switching transistors is preferable.

As mentioned above in detail, the present thermal head has a linear thermal line which is not separated to the insulated cells, a plurality of group recognition lines coupled directly with either the power source or the clamp power source, and the number of switching transistors is considerably reduced.

From the foregoing it will now be apparent that a new and improved thermal head has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A thermal head for a facsimile printer comprising;
   a continuous linear thermal line attached on a substrate,
   said thermal line being provided with a plurality of cells ($r_1$, $r_2$, $r_3$, $r_4$, . . . ),
   those cells being classified into a plurality of groups each having 2n (n is an even integer) cells,
   a first set of lead wires each coupled with a cell with a predetermined interval and being provided on one side of the thermal line for providing printing data to the thermal line through a respective transistor switch which is controlled by an input picture signal,
   a second set of lead wires each coupled with a cell with a predetermined interval and being provided on the other side of the thermal line for providing printing data to the thermal line through a respective transistor switch which is controlled by an input picture signal,
   n number of group recognition lines each coupled with cells in every 2n cells of said thermal line, half of said group recognition lines being provided on one side of the thermal line, and the other half of the same being provided on the other side of the thermal line,
   said group recognition lines and the head wires being coupled with the cells so that each cell is sandwiched between one of the lead lines and one of the group recognition lines,
   one of said group recognition lines being provided with a power voltage for energizing thermal cells, other group recognition lines being clamped to the predetermined clamp voltage, and the group recognition line which is provided with a power supply voltage is switched alternately among all the group recognition lines.

2. A thermal head for facsimile printer according to claim 1, wherein the value n is 2, and two group recognition lines ($S_1$, $S_2$) are provided.

3. A thermal head for a facsimile printer according to claim 1, wherein the value n is 4, four group recognition lines ($S_1$, $S_2$, $S_3$, $S_4$) are provided.

4. A thermal head for a facsimile printer according to claim 1, wherein the value n is 8, eight group recognition lines ($S_1$ through $S_8$) are provided.

5. A thermal head for a facsimile printer comprising:

(a) a plurality of separated heater cells positioned in a straight line on a substrate;
(b) a plurality of group recognition lines;
(c) a plurality of input picture signal lines,
(d) wherein each of said group recognition lines and each of said input picture signal lines are directly connected to a plurality of said heater cells such that only a certain one of said group recognition lines and a certain one of said input picture signal lines are connected to opposite sides of a corresponding one of said heater cells; and wherein one of said group recognition lines and one of said input picture signal lines are coupled to a clamp voltage source.

* * * * *